United States Patent [19]

Chiang et al.

[11] 4,401,628

[45] Aug. 30, 1983

[54] PROCESS FOR MAKING HIGH QUALITY NUCLEAR FUEL GRADE AMMONIUM DIURANATE FROM URANYL FLUORIDE SOLUTIONS

[75] Inventors: Peter T. Chiang, Monroeville, Pa.; Erich W. Tiepel, Littleton, Colo.

[73] Assignee: Westinghouse Electric Corp., Pittsburgh, Pa.

[21] Appl. No.: 226,336

[22] Filed: Jan. 19, 1981

[51] Int. Cl.³ ............................................. C01G 56/00
[52] U.S. Cl. ........................................ 423/15; 423/253
[58] Field of Search ................................. 423/15, 253

[56] References Cited

U.S. PATENT DOCUMENTS

| | | | |
|---|---|---|---|
| 2,466,118 | 4/1949 | Miller et al. | 423/15 |
| 3,394,997 | 7/1968 | DeHollander | 423/15 |
| 3,726,650 | 4/1973 | Welty | 423/15 |
| 3,758,664 | 9/1973 | Gerrald | 423/15 |
| 4,234,550 | 11/1980 | DeHollander | 423/15 |

*Primary Examiner*—Herbert T. Carter
*Attorney, Agent, or Firm*—R. D. Fuerle

[57] ABSTRACT

A continuous process is disclosed for precipitating uranium from an aqueous solution formed by the hydrolysis of uranium hexafluoride gas. Undersized ammonium diuranate particles are formed in a first container by mixing the aqueous solution and an ammonium hydroxide solution containing about 10 to about 30% by weight ammonium. The ratio of the two solutions should be such that there are about 20 to about 30 moles of ammonium per mole of uranium. The temperature is maintained at about 30° to about 50° C. and the residence time in the first container is about 14 to about 57 seconds. The slurry is then transported to a second container for further particle growth where it is agitated at a temperature of about 20° to 40° C. for a residence time of about 2 to about 9 minutes. The resulting ammonium diuranate precipitate has a surface area of about 10 to about 20 meters squared per gram. The precipitate can then be calcined and pressed into pellets.

10 Claims, 1 Drawing Figure

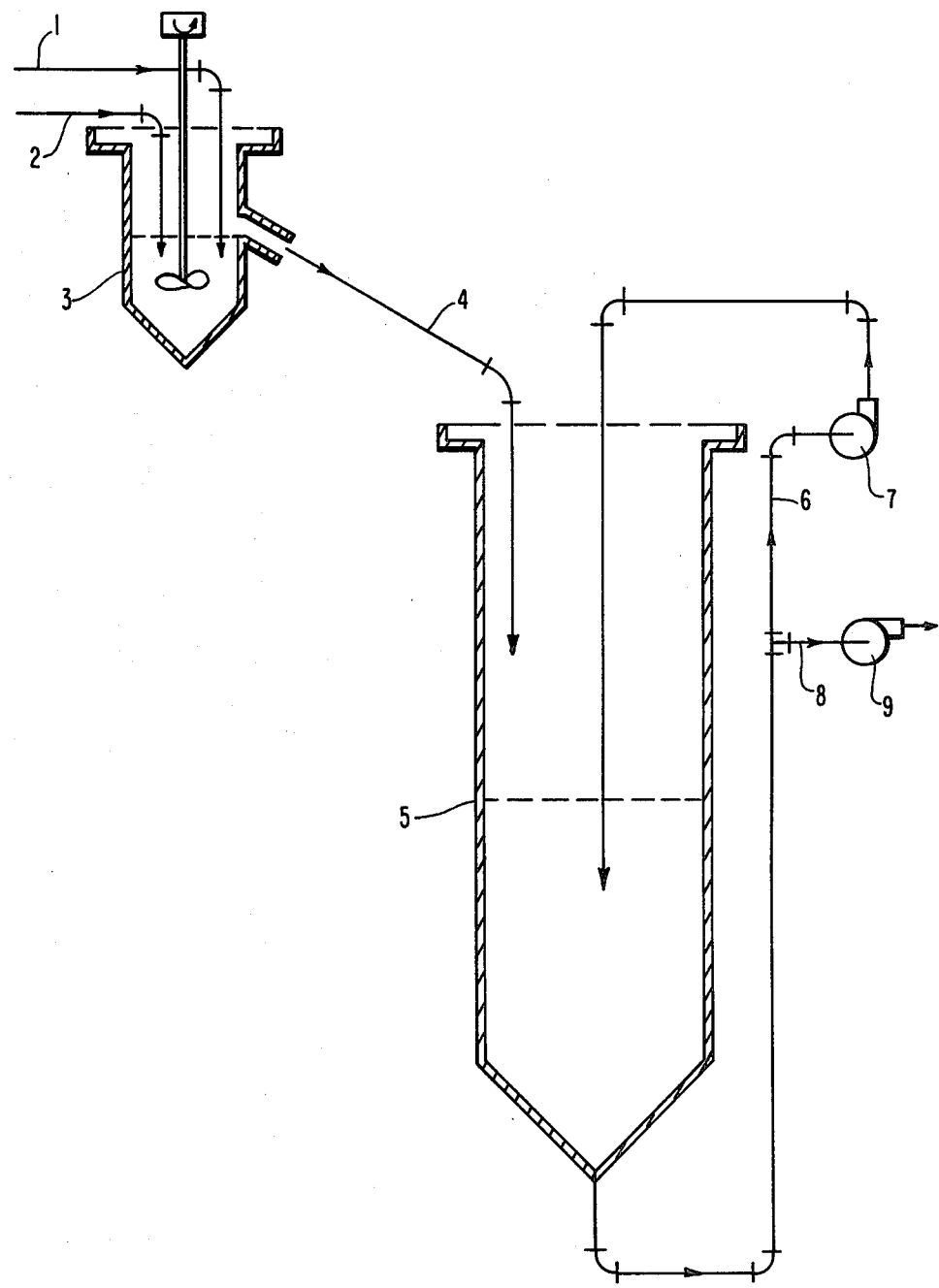

PROCESS FOR MAKING HIGH QUALITY NUCLEAR FUEL GRADE AMMONIUM DIURANATE FROM URANYL FLUORIDE SOLUTIONS

BACKGROUND OF THE INVENTION

In the processing of uranium hexafluoride into fuel for nuclear reactors, uranium hexafluoride gas is dissolved in water to form $UO_2F_2$. Ammonium diuranate (ADU) is then precipitated from the solution by the addition of the ammonium hydroxide. The ADU precipitate is separated from the solution and is calcined to produce $UO_2$, which is pressed and sintered into pellets for use in reactors.

If the ADU precipitate is too coarse, the resulting pellets of $UO_2$ will not be dense enough to perform satisfactorily in a reactor. On the other hand, if the particle size of the ADU precipitate is too fine, the resulting $UO_2$ pellets may crumble and fall apart. It has been found that the ideal particle size is achieved when the surface area of the ADU particles is about 10 to about 20 $M^2/g$. Until now, it has been difficult to control the process variables during the precipitation of the ADU to consistently and repeatedly achieve a particle size within the desired range. Since, in the $UO_2$-$NH_4OH$-$H_2O$ system, particle growth is favored over nucleation, the ADU particles formed are normally too large for use in making $UO_2$ pellets.

SUMMARY OF THE INVENTION

We have discovered that ADU can be precipitated which has a particle size distribution as measured by its surface area of about 10 to about 20 $M^2/g$ if the precipitation is performed in two steps and the temperature and residence time of each step are carefully controlled. The first step is to feed the uranyl fluoride and ammonium hydroxide solutions continuously to a precipitator where undersized ADU particles are formed by controlling the temperature and residence time. The ADU slurry is subsequently transported to a digester for further particle growth, again under controlled temperature and residence time, but without the addition of uranyl fluoride or ammonium hydroxide solution. In the process of this invention, an ADU precipitate of the proper particle size can be repeatedly achieved without the use of additives. The ADU precipitate produced by the process of this invention can be used to make $UO_2$ pellets which are dense enough to meet the reactor requirements but yet will not crumble and disintegrate.

CROSS-REFERENCE TO RELATED APPLICATION

U.S. patent application Ser. No. 034,309, filed Apr. 30, 1979 by P. T. Chiang entitled "Method of Precipitating ADU" addresses the problem described in this invention by the addition of an acrylic polymer to the uranium solution.

PRIOR ART

U.S. Pat. No. 2,466,118 discloses the precipitation of ammonium diuranate with ammonium hydroxide from a solution of uranyl fluoride. The residence time in the precipitator is not disclosed, the operating temperature range in the digester is higher than in the precipitator, the ammonium hydroxide is added to the digester, and, to avoid disturbing the settled precipitate, there is no agitation in the digester.

U.S. Pat. No. 3,758,644 also deals with the precipitation of ammonium diurante from a solution of uranyl fluoride using ammonium hydroxide.

DESCRIPTION OF THE INVENTION

The accompanying drawing illustrates a certain presently preferred process according to this invention.

In the drawing a solution of uranyl fluoride in line 1 and a solution of ammonium hydroxide in line 2 enter the agitated precipitator 3 where ammonium diuranate precipitates. The ammonium diuranate slurry passes through line 4 into digester 5. The bulk of the slurry in the digester is recirculated through line 6 by pump 7 to provide agitation while a small portion of it is discharged through line 8 by pump 9 as product.

Enriched uranium, typically containing about 3 to about 4% by weight $U^{235}$ in the form of uranium hexafluoride gas, is reacted with water to produce a solution of uranyl fluoride and hydrogen fluoride according to the equation $UF_6+2H_2O\rightarrow UO_2F_2+4HF$. A uranyl fluoride solution may contain about 20 to about 240 grams per liter of uranium, but below about 80 grams per liter the process becomes uneconomical because too much water must be processed, and above about 160 grams per liter it becomes difficult to keep all of the uranyl fluoride in solution.

The ammonium hydroxide can be added as either a solution of ammonium hydroxide or as gaseous ammonia which forms ammonium hydroxide in place. The ammonium hydroxide solution should be about 10 to about 30% (all percentages herein are by weight) ammonia but less than 24% ammonia is uneconomical due to the large amounts of water that must be processed, and 28% ammonia is the commercially available ammonium hydroxide solution. The proportion of the ammonium hydroxide solution to the uranyl fluoride solution should be such that about 20 to about 30 moles of ammonia are present for each mole of uranium. If less than 20 moles of ammonia are present for each mole of uranium some of the uranium may not be precipitated, and if more than 30 moles are used ammonia may be wasted. Typically, about 26 moles of ammonia are used for each mole of uranium. When the ammonium hydroxide and uranyl fluoride solutions are mixed, ammonium diuranate precipitates according to the equation:

$$2UO_2F_2+6NH_4OH\rightarrow(NH_4)_2U_2O_7\downarrow+4NH_4F+3H_2O$$

The temperature of the mixture of the two solutions in the precipitator should be controlled at about 30° to about 50° C. by external cooling or heating. The process still works satisfactorily below a temperature of 30° C. but since the precipitation reaction is exothermic, it is expensive to cool the solution to lower temperatures. If the temperature is above about 50° C., the resulting precipitate tends to be too coarse. The average residence time in the precipitator should be between about 14 and about 57 seconds. If the residence time is greater than about 57 seconds, the precipitate tends to be too coarse and if the residence time is less than about 14 seconds, the precipitation may be incomplete. If the residence time is long (i.e., near 57 seconds) the temperature should be low (i.e., near 30° C.), and if the residence time is short (i.e., near 14 seconds), the temperature should be high (i.e., near 50° C.) In other words, there should be an inverse relationship between the temperature and the residence time. The solution in the precipitator should be stirred to insure a complete reaction. The resulting slurry is then sent to the digester.

In the digester the ADU particle size distribution is brought from undersized to within the desired range, and the precipitation reaction is completed. Some type of turbulence, such as stirring or recirculation with a pump is required in the digester to insure a complete precipitation reaction. The temperature of the slurry in the digester should be between about 20° and about 40° C. If the temperature is less than about 20° C., the process of this invention will still work but it will be necessary to cool the slurry, which is expensive. If the temperature is greater than about 40° C., the resulting precipitate will be too coarse. The residence time in the digester should be between about 2 and about 9 minutes. If the residence time is less than about 2 minutes, the ADU precipitate may still be too fine and the precipitation reaction may be incomplete. If the residence time is greater than about 9 minutes, the resulting precipitate tends to be too coarse. As in the precipitator, the relationship between the temperature and the residence time should be an inverse one so that shorter residence times are associated with higher temperatures and longer residence times are associated with lower temperatures.

Once the slurry leaves the digester, the precipitate is separated from the fluid. This may be accomplished by centrifuge, filter, or any other satisfactory method. The ADU precipitate can then be calcined which converts it to $UO_2$. The $UO_2$ can then be pressed into pellets, sintered, and used in nuclear reactors. The following example further illustrates this invention.

EXAMPLE 1

The effects of temperatures ranging from 31° to 58° C. and residence times ranging from 14 to 57 seconds on the quality of precipitated ammonium diuranate were investigated. In the experiments, the ammonium hydroxide solution had a concentration of 28%.

The following table gives the uranium concentrations and molar ratio of ammonia to uranium for all of the experiments as well as the conditions in the precipitator and digester and the average surface area of the resulting precipitates.

EXAMPLE 2

In Example 2 three of the experiments described in Example 1 were selected for measuring the ADU slurry settling rate, the ADU surface area, and the soluble uranium content in the filtrate before and after digestion. The following table gives the results of these experiments:

| Run No. | ADU Slurry Settling Rate, mm/min | | ADU Powder BET Area, $M^2/g$ | | Soluble U-Content in Filtrate g/l | |
|---|---|---|---|---|---|---|
| | B.D.* | A.D.** | B.D. | A.D. | B.D. | A.D. |
| 3 | 3.8 | 6.9 | 36.4 | 13.7 | — | — |
| 8 | 9.0 | 11.0 | 38.8 | 8.4 | — | — |
| 9 | 9.0 | 9.8 | 22.1 | 18.6 | 290 | 240 |

*B.D. — Before Digestion
**A.D. — After Digestion

These data indicate that the ADU particles discharged from the precipitator are undersized and the digestion step is needed to bring the ADU surface area to within the specified range of 10 to 20 $M^2/g$. In addition, the digestion step brings the ADU precipitation nearer to completion.

What we claim is:

1. A continuous process for precipitating ammonium diuranate from an aqueous solution of uranyl fluoride comprising
   (A) forming undersized ammonium diuranate particles in a first container by mixing said aqueous solution and an ammonium hydroxide solution containing about 10 to about 30% by weight ammonia, in a ratio of about 20 to about 30 moles of ammonia per mole of uranium, at a temperature of up to about 50° C. a residence time in said first container of about 14 to about 57 seconds; and
   (B) transporting said slurry to a second container and agitating it in said second container for further particle growth at a temperature of up to about 40° C. for a residence time of about 2 to about 9 minutes.

2. A process according to claim 1 wherein said aqueous solution contains about 20 to about 240 grams per liter of uranium.

3. A process according to claim 1 wherein said temperature in said first container is at least about 30° C.

| Experiment No. | U-Concn. in Feed, g/U | NH3/U Mole Ratio | Precipitator Temp., °C. | Precipitator R.T. Sec. | Digester Temp., °C. | Digester R.T. Min. | ADU Physical Properties Settling Rate, mm/min | ADU Physical Properties BET Area $M^2/g$ |
|---|---|---|---|---|---|---|---|---|
| Effect of Precipitator Temperature | | | | | | | | |
| 1 | 161 | 24 | 31 | 22 | 27 | 9 | 4.9 | 19.7 |
| 2 | 168 | 22 | 48 | 23 | 31 | 9 | 11.0 | 14.2 |
| 3 | 157 | 27 | 31 | 41 | 28 | 4 | 6.9 | 13.7 |
| 4 | 171 | 24 | 47 | 39 | 29 | 4 | 18.0 | 11.2 |
| 5 | 171 | 25 | 58 | 48 | 28 | 5 | 25.0 | 4.6 |
| Effect of Precipitator Residence Time (R.T.) | | | | | | | | |
| 6 | 161 | 24 | 31 | 22 | 27 | 9 | 4.9 | 19.7 |
| 7 | 157 | 27 | 31 | 41 | 28 | 4 | 6.9 | 13.7 |
| 8 | 163 | 25 | 31 | 57 | 25 | 5 | 11.0 | 8.4 |
| 9 | 160 | 23 | 48 | 14 | 31 | 2 | 9.8 | 18.6 |
| 10 | 165 | 23 | 48 | 24 | 28 | 4 | 12.0 | 11.9 |
| 11 | 171 | 24 | 48 | 39 | 29 | 4 | 18.0 | 11.2 |
| Effect of Digester Residence Time | | | | | | | | |
| 12 | 165 | 23 | 48 | 24 | 28 | 4 | 12.0 | 11.9 |
| 13 | 168 | 22 | 48 | 23 | 31 | 9 | 11.0 | 14.2 | and said temperature in said second container is at least about 20° C.

4. A process according to claim 1 including the additional last steps of separating said precipitate from said solution, calcining said precipitate to form $UO_2$ and pressing said $UO_2$ into pellets.

5. A process according to claim 1 wherein shorter residence times are used with higher temperatures and longer residence times are used with lower temperatures.

6. A method of continuously producing ammonium diuranate having a surface area of about 10 to about 20 $m^2/g$ from an aqueous solution of $UO_2F_2$ comprising
(A) forming a slurry in a first container by precipitating said ammonium diuranate by contacting said aqueous solution with an ammonium hydroxide solution for a time of 14 to 57 seconds at a temperature of 30° to 50° C., said time varying inversely with said temperature; and
(B) digesting said slurry in a second container for a time of 2 to 9 minutes at a temperature of 20° to 40° C., said time varying inversely with said temperature.

7. A method according to claim 6 wherein said ammonium hydroxide solution is about 10 to about 30% by weight ammonia.

8. A method according to claim 6 wherein the molar ratio of ammonia to uranium is about 20 to about 30.

9. A method according to claim 6 wherein said aqueous solution contains about 20 to about 240 grams per liter of uranium.

10. A method according to claim 6 including the additional last steps of separating said precipitate from said solution, calcining said precipitate to form $UO_2$, and pressing said $UO_2$ into pellets.

* * * * *